UNITED STATES PATENT OFFICE.

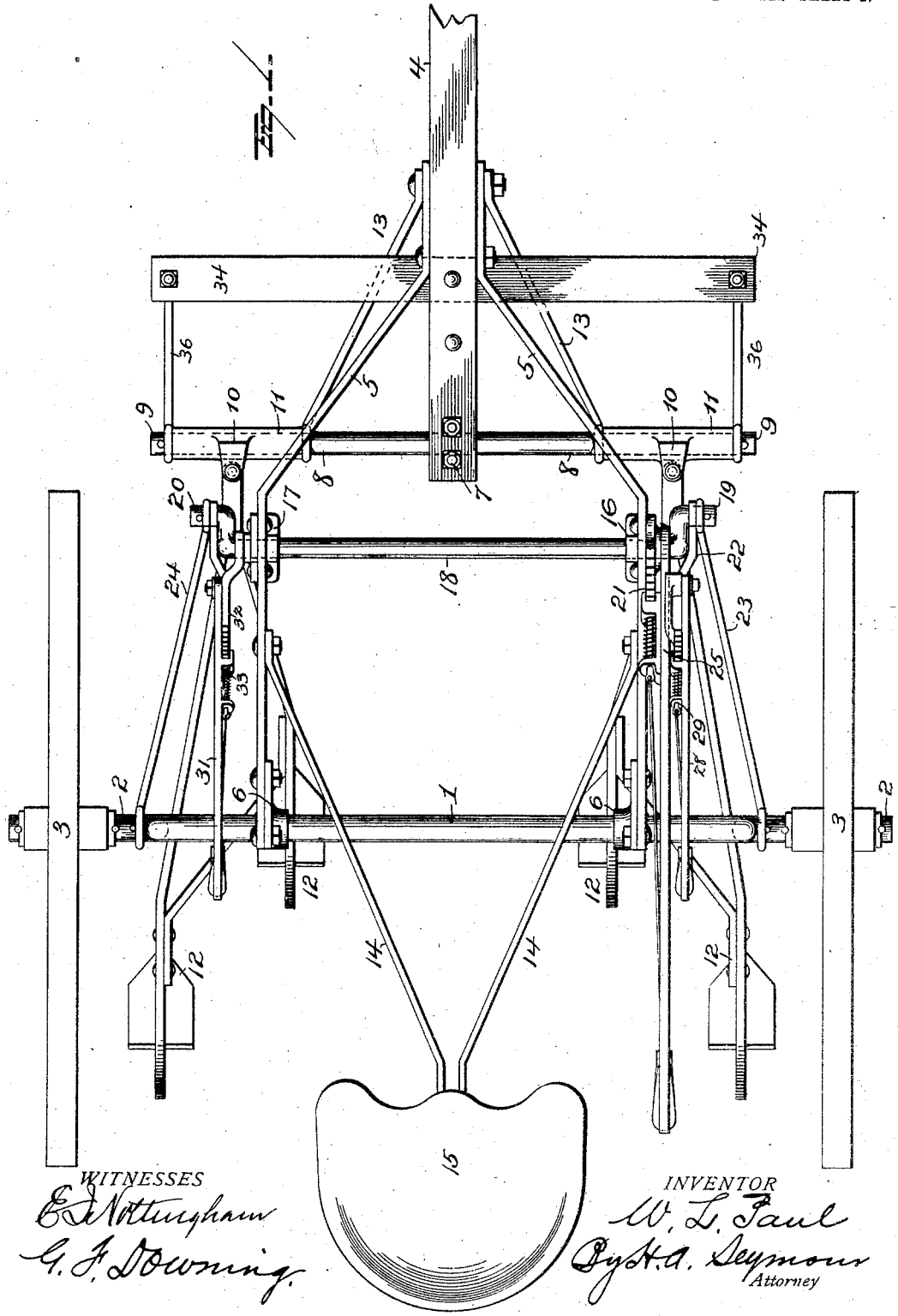

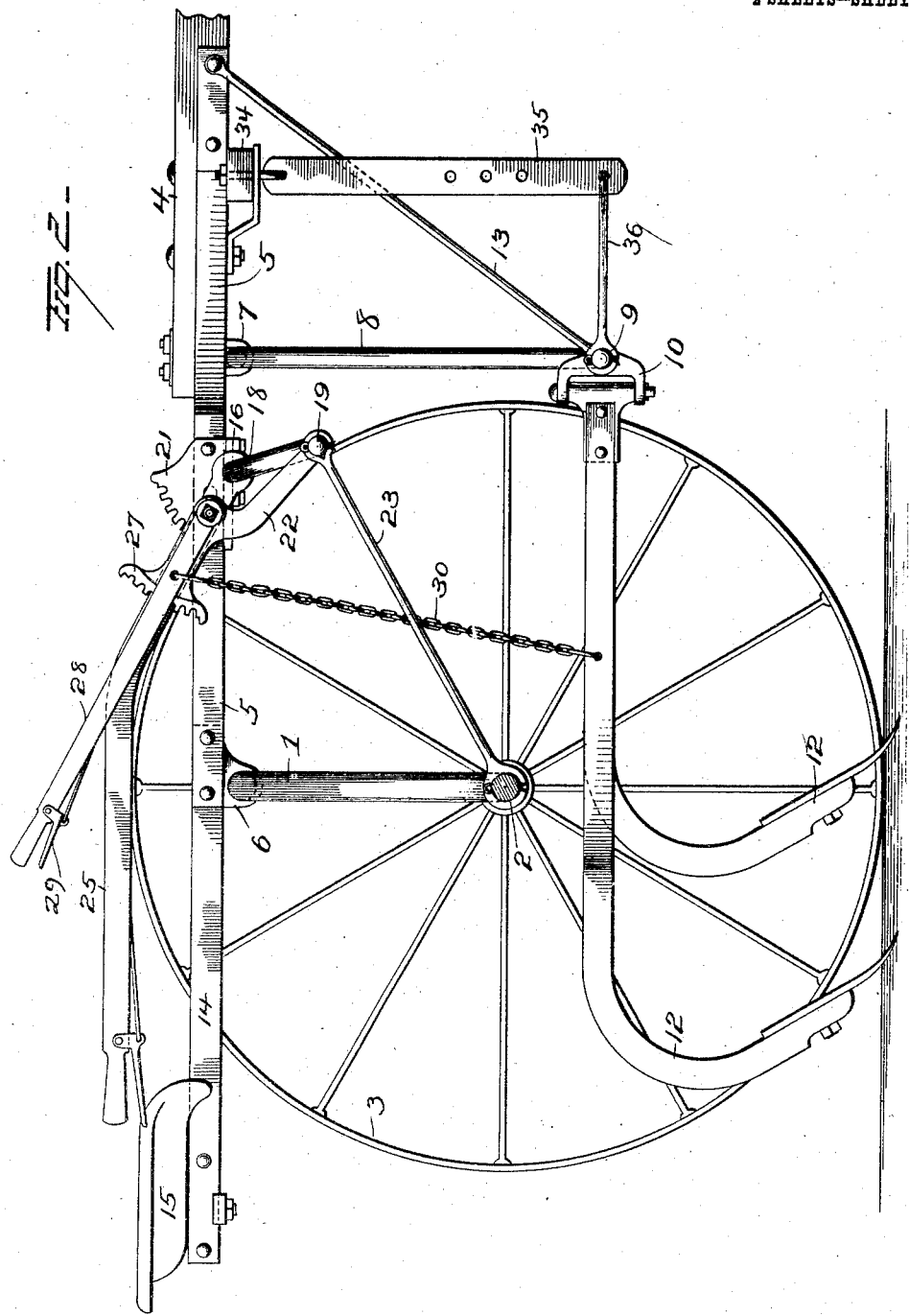

WILLIAM L. PAUL, OF SOUTH BEND, INDIANA, ASSIGNOR TO OLIVER CHILLED PLOW WORKS, OF SOUTH BEND, INDIANA.

CULTIVATOR.

No. 893,361.   Specification of Letters Patent.   Patented July 14, 1908.

Application filed May 22, 1907. Serial No. 375,160.

*To all whom it may concern:*

Be it known that I, WILLIAM L. PAUL, of South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

My invention relates to an improvement in cultivators, and more particularly to that type in which the shovels are arranged in gangs which can be raised from operative position and lowered to their work,—one object of the invention being to so construct the cultivator that equilibrium will be maintained and the raising of the frame at its front end avoided when the shovel gangs are lowered to their work.

A further object is to provide means for shifting the carrying wheels and simultaneously raising the shovel gangs, by the use of a single lever and so that the draft or traction of the machine combined with its weight will counterbalance the weight of the gangs and thus reduce the amount of work necessary in raising the gangs.

With these objects in view the invention consists in certain novel features of construction and combinations and arrangements of parts as hereinafter set forth and pointed out in the claims.

In the accompanying drawings, Figure 1 is a plan view of a portion of a cultivator showing an embodiment of my invention, and Fig. 2 is a side elevation of the same.

1 represents an arch axle provided at its respective ends with journals 2 for the reception of carrying wheels 3, and 4 represents the tongue of the machine. A frame 5 is secured at its forward end to the tongue 4 and the rear ends of the respective members of this frame terminate over the arch axle, where they are provided with boxes 6 for the accommodation of said axle. The rear end of the tongue 4 is provided with a hanger 7 for the accommodation of an arch 8, the depending members of which are provided at their lower ends with lateral projections 9. To these projections brackets 10 are pivotally connected, said brackets having sleeves 11 loosely mounted on the lateral projections 9. The beams of the shovel gangs 12 are connected at their forward ends to the brackets 10 and braces 13 extend from the lateral projections 9 of the arch 8 to the tongue 4 and are secured to the latter in proximity to the attachment of the frame 5 thereto. Seat bars 14 are secured at their forward ends to intermediate portions of the respective members of frame 5 and to the rear ends of said bars 14, a seat 15 is secured.

Bearing boxes 16 and 17 are secured to the respective members of the frame 5 at points in advance of the arch 1 and rearwardly of the arch 8, for the accommodation of a shaft 18 which is provided at its respective ends with crank arms 19 and 20. The bearing box 16 constitutes a part of a toothed segment 21, secured to one member of the frame 5. The crank arm 19 is connected by means of a rod 23 with one of the journals of the arch axle 1. The other journal of the arch axle is connected by means of a rod 24 with the crank-arm 20 of shaft 18.

A lever 25, provided with an arm 22 attached to the crank arm 19 of shaft 18, is fixed to said shaft in close proximity to the segment 21 and is provided with a spring-actuated latch to engage the teeth of said segment. A segment 27 is bolted to the lever 25 and a lever 28 is pivoted to this segment and provided with a spring-actuated latch 29 to engage the teeth thereof. A chain 30 connects the lever 28 with one of the several gangs 12. A lever 31, similar to the lever 28, is pivoted to a toothed segment 32 attached to the left-hand end of the shaft 18 and this lever is provided with a spring-actuated latch 33 to engage the teeth of segment 32. The lever 31 is connected with the other shovel gang by means of a chain (not shown).

From the construction and arrangement of parts above described it will be seen that the arch-axle 1 is connected with the shaft 18 below the axis of the latter through the medium of the crank arms 19—20 and rods 23—24 and that the shovel-gangs are connected with said shaft above its axis through the medium of chains 30 and levers 25—28 and 31, so that when the lever 25 is operated, the carrying wheels will be shifted and the plow gangs raised or lowered according to the direction in which said lever is moved. It is a fact that when the gangs are lowered to their work, the wheels should be set forward on the frame further than when the gangs are raised and by my improvements the raising and lowering of the shovel gangs and the shifting of the wheels can be effected simultaneously by manipulating lever 25. By the provision of the levers 28 and 31 and their connections with the shovel-gangs, as above explained, I am enabled to adjust the depth which it may be desired the shovels shall have, independently of the shifting of the wheels.

An equalizer 34 is attached at a point intermediate of its ends to the rear portion of the tongue 4 and from the respective ends of the equalizer, bars 35 depend and these bars are adapted for the attachment of draft animals. The lower end of each bar 35 is connected, by means of a link or rod 36, with a lateral projection 9 of the arch 8.

Slight changes might be made in the details of construction of my invention without departing from the spirit thereof or limiting its scope and hence I do not wish to restrict myself to the precise details herein set forth.

Having fully described my invention what I claim as new and desire to secure by Letters Patent is:

1. In a cultivator, the combination with a frame, an arch axle, carrying wheels and a shovel gang, of a shaft provided with an arm, a connection between said arm and the arch axle, a lever for operating said shaft, a second lever pivoted to the first mentioned lever, a connection between said second lever and the shovel gang, and means for locking said levers together.

2. In a cultivator, the combination with a frame, carrying wheels, an arch axle, and shovel gangs, of a shaft provided with crank-arms, connections between said crank arms and the arch axle, a toothed segment secured to the frame, a lever secured to said shaft and coöperating with said toothed segment, a toothed segment secured to said lever, a lever pivoted to said last-mentioned toothed segment and coöperating therewith, a connection between the last-mentioned lever and one of the shovel gangs, a third segment attached to the shaft, a lever pivoted to this segment and coöperating therewith, and a connection between the last-mentioned lever and another shovel gang.

3. In a cultivator, the combination with a frame, carrying wheels, an arch axle, and a shovel gang, of a shaft mounted on the frame, connecting devices between the arch axle and said shaft at one side of the axis of the latter, a connection between the shovel gang and said shaft at the opposite side of the axis of the latter said connection being movable with said shaft, and means for turning said shaft to simultaneously shift the arch axle and raise or lower the shovel gang through the medium of the connections of said axle and shovel gang with said shaft.

In testimony whereof, I have signed this specification in the presence of two subscribing witnesses.

WILLIAM L. PAUL.

Witnesses:
FRANCIS C. NIPPOLD,
W. A. WEED.